(12) United States Patent
Haindl et al.

(10) Patent No.: US 11,900,785 B2
(45) Date of Patent: Feb. 13, 2024

(54) THERMAL PROTECTION OF CONNECTOR

(71) Applicant: Samsung SDI Co., Ltd., Yongin-si (KR)

(72) Inventors: Michael Haindl, Hartberg (AT); Fritz Haring, Bruck an der Mur (AT)

(73) Assignee: Samsung SDI Co., Ltd., Yongin-si (KR)

( * ) Notice: Subject to any disclaimer, the term of this patent is extended or adjusted under 35 U.S.C. 154(b) by 50 days.

(21) Appl. No.: 17/673,626

(22) Filed: Feb. 16, 2022

(65) Prior Publication Data

US 2022/0270466 A1 Aug. 25, 2022

(30) Foreign Application Priority Data

Feb. 19, 2021 (EP) ..................................... 21158086
Jan. 28, 2022 (KR) ......................... 10-2022-0013665

(51) Int. Cl.
*G08B 21/18* (2006.01)
*H01M 50/296* (2021.01)
(Continued)

(52) U.S. Cl.
CPC ........ *G08B 21/182* (2013.01); *H01M 10/482* (2013.01); *H01M 10/486* (2013.01);
(Continued)

(58) Field of Classification Search
CPC ............. G08B 21/182; H01M 50/296; H01M 50/569; H01M 10/482; H01M 10/486; H01R 13/6683
(Continued)

(56) References Cited

U.S. PATENT DOCUMENTS 8,427,171 B2 * 4/2013 Carkner .............. H01M 10/486
324/756.05
9,207,285 B1 * 12/2015 Swanton .............. G01R 31/374
(Continued)

FOREIGN PATENT DOCUMENTS

EP 3 683 087 A1 7/2020

OTHER PUBLICATIONS

EESR; EP 21158086.5-1108; Samsung SDI Co., Ltd.; dated Jun. 17, 2021.

*Primary Examiner* — Zhen Y Wu
(74) *Attorney, Agent, or Firm* — Lewis Roca Rothgerber Christie LLP

(57) ABSTRACT

In a connector system for a battery system, the connector system includes: a connector configured to electrically connect to a counterpart of the connector, wherein the connector comprises a negative connection element and a positive connection element; a first temperature sensor thermally connected to the negative connection element; a second temperature sensor thermally connected to the positive connection element; and a control unit configured to receive a first temperature signal from the first temperature sensor and to receive a second temperature signal from the second temperature sensor; wherein the control unit configured to generate a first value based on the first temperature signal and a second value based on the second temperature signal; and wherein the control unit is further configured to generate an alert signal in response to an absolute value of a difference between the first value and the second value exceeding a predefined threshold.

14 Claims, 3 Drawing Sheets

(51) Int. Cl.
*H01M 10/48* (2006.01)
*H01M 50/569* (2021.01)
*H01R 13/66* (2006.01)

(52) U.S. Cl.
CPC ....... *H01M 50/296* (2021.01); *H01M 50/569* (2021.01); *H01R 13/6683* (2013.01)

(58) Field of Classification Search
USPC ........................................................ 340/584
See application file for complete search history.

(56) References Cited

U.S. PATENT DOCUMENTS

| | | | |
|---|---|---|---|
| 10,367,239 B1* | 7/2019 | Dao | H01M 50/209 |
| 2002/0081486 A1 | 6/2002 | Williams | |
| 2006/0076932 A1* | 4/2006 | Roh | H02J 7/0031 |
| | | | 320/134 |
| 2007/0222419 A1* | 9/2007 | Wolf | H02J 7/0047 |
| | | | 320/150 |
| 2011/0298472 A1* | 12/2011 | Carkner | H01M 10/486 |
| | | | 324/538 |
| 2014/0023897 A1* | 1/2014 | Suga | H01M 50/516 |
| | | | 429/90 |
| 2014/0268473 A1 | 9/2014 | Hassan-Ali et al. | |
| 2015/0372354 A1* | 12/2015 | Nakano | H01M 50/507 |
| | | | 429/90 |
| 2016/0039297 A1* | 2/2016 | Kretschmer | G01K 13/00 |
| | | | 439/620.21 |
| 2016/0111758 A1* | 4/2016 | Stimm | G01R 31/389 |
| | | | 429/90 |
| 2016/0372946 A1* | 12/2016 | Menzer | H01M 10/4257 |
| 2017/0025868 A1* | 1/2017 | Gravett | H02J 7/0031 |
| 2019/0296565 A1* | 9/2019 | Connolly | B60L 3/0023 |
| 2019/0319317 A1* | 10/2019 | Koujiya | H01R 13/6683 |
| 2019/0334216 A1* | 10/2019 | Kim | H01M 50/569 |
| 2020/0076007 A1* | 3/2020 | Jeon | H01M 50/569 |

* cited by examiner

THERMAL PROTECTION OF CONNECTOR

CROSS-REFERENCE TO RELATED APPLICATION

The present application claims priority to and the benefit of European Patent Application No. 21158086.5, filed in the European Patent Office on Feb. 19, 2021 and Korean Patent Application No. 10-2022-0013665, filed on Jan. 28, 2022, the entire contents both of which are incorporated herein by reference.

BACKGROUND

1. Field

Aspects of some embodiments of the present invention relate to a connector system for establishing an electric connection with a battery system and, for example, to a connector system, wherein the connection elements are protected against thermal overload.

2. Description of the Related Art

In the recent years, vehicles for transportation of goods and people have been developed using electric power as a source for motion. Such electric vehicles may be automobiles that are propelled by an electric motor, using energy stored in rechargeable batteries. An electric vehicle may be solely powered by batteries or may be a form of hybrid vehicle additionally powered by, for example, a gasoline generator. Furthermore, the vehicle may include a combination of an electric motor and a combustion engine. In general, an electric-vehicle battery (EVB) or traction battery is a battery used to power the propulsion of battery electric vehicles (BEVs). Electric-vehicle batteries generally differ from starting, lighting, and ignition batteries because they are designed to give power over sustained periods of time. A rechargeable or secondary battery differs from a primary battery in that it can be repeatedly charged and discharged, while the latter generally provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

The above information disclosed in this Background section is only for enhancement of understanding of the background and therefore the information discussed in this Background section does not necessarily constitute prior art.

SUMMARY

Aspects of some embodiments of the present invention relate to a connector system for establishing an electrical connection with a battery system and, for example, to a connector system, wherein the connection elements are protected against thermal overload. Aspects of some embodiments of the present invention further relate to a battery system comprising the connector system according to some embodiments of the present invention. Also, aspects of some embodiments of the present invention relate to a battery module comprising several of those battery systems. Further, aspects of some embodiments of the present invention relate to a vehicle employing the battery system or the battery module according to some embodiments of the present invention. Moreover, aspects of some embodiments of the present invention relate to a method for controlling an electrically conductive connection to a battery system using the connector system according to the invention.

According to some embodiments of the present inventions, in a connector system for establishing an electric connection with a battery system, the connector system includes: a connector for establishing an electrically conductive connection to a suitable counterpart of the connector, wherein the connector comprises a negative connection element and a positive connection element; a first temperature sensor thermally connected to the negative connection element; a second temperature sensor thermally connected to the positive connection element; and a control unit configured for receiving a first temperature signal from the first temperature sensor and for receiving a second temperature signal from the second temperature sensor. The control unit is adapted for generating a first value based on the first temperature signal and a second value based on the second temperature signal. The control unit is further adapted for generating an alert signal when the absolute value of a difference between the first value and the second value exceeds over a predefined threshold.

According to some embodiments, by measuring the temperature of the connection elements directly, a high accurate protection is possible, and the connector can be minimized to the required normal current without high impact of unknown environmental conditions.

According to some embodiments, the temperature signals may depend monotonously (or strictly monotonously) on the respective measured temperature. In other words, the temperature signals may be a monotonic (or strictly monotonic) function of the measured temperature.

According to some embodiments, if the absolute value of the difference between the first value and the second value exceeds over a predefined threshold, the probability that a contact resistance between one of the connection elements and its respective counterpart connection element (the latter not being part of the invention) is increased, which in turn may indicate a connection failure.

According to some embodiments, the decision as to whether or not an alert signal is generated is based on the absolute value of the difference between the first value and the second value and thus independent of the algebraic sign of said difference. However, the signal itself (i. e., the kind of signal) may be depending on the algebraic sign of the difference; in this case, the signal may yield an indication, which of the two connection elements may be affected by a connection failure.

According to some embodiments, the alert signal itself may be an electric signal provided at an output of the control unit. Alternatively, according to some embodiments, the alert signal may be proved wirelessly, e. g., via an NFC signal or a WLAN signal or the like.

Instead of "negative connection element," also the term "first connection element" could be used. Correspondingly, it could be used the expression "second connection element" instead of "positive connection element." In this context, the terms "negative connection element" and "positive connection element" have simply been used to make clear that the "negative connection element" may be adapted to be connected to an anode of a battery (or stack of battery cells), and that the "positive connection element" may be adapted to be connected to a cathode of a battery (or stack of battery cells). Usually, however, any one of the connection elements could be used to establish a connection to the anode, and the other one to establish a connection with the cathode of a battery or stack of battery cells.

According to some embodiments of the present invention, in the connector system, the predefined threshold may depend on the first temperature signal or on the second temperature signal or on a mean value of the first and second temperature signal.

According to some embodiments, the higher the voltages, the larger may be the tolerances in the absolute difference between the temperature of the negative connection element and the positive connection element. To take this into account, a kind of relative temperature difference may be used. To that end, the difference between the absolute temperature values may be divided by the temperature values of the negative connection element or by that of the positive connection element or by a mean value (e. g., the arithmetic mean) of the temperature values of the negative and positive connection elements.

According to some embodiments, in the connector system, the connector is formed as a socket being connectable with a suitable plug.

According to some embodiments, in the connector system, the connector is formed as a plug being connectable with a suitable socket.

According to some embodiments, in the connector system, the negative connection element and the positive connection element are each configured for establishing a high voltage (HV) connection.

According to some embodiments, in the connector system, at least one of the temperature sensors is a thermistor, for example a negative temperature coefficient (NTC) thermistor or a positive coefficient temperature (PTC) thermistor, or a thermocouple.

According to some embodiments, in the connector system, the control unit is further adapted for generating an alert signal in case the first value or the second value indicates that the absolute temperature of the negative connection element or the positive connection element exceeds a predefined maximum value.

According to some embodiments, in the connector system, the connector may be integrated in a housing adapted for accommodating a stack of battery cells.

According to some embodiments, a battery system includes a stack of battery cells and the connector system, wherein the stack of battery cells is accommodated in the housing, and wherein the negative connection element is electrically connected with the anode of the stack of battery cells and the positive connection element is electrically connected with the cathode of the stack of battery cells.

According to some embodiments, the battery system includes a stack of battery cells and the connector system according to the invention, wherein the negative connection element is electrically connected with the anode of the stack of battery cells and the positive connection element is electrically connected with the cathode of the stack of battery cells.

According to some embodiments, the battery system further includes a battery management unit, and wherein the control unit is integrated into the battery management unit.

A further aspect of the invention relates to a battery module comprising two or more battery systems according to the invention.

A further aspect of the invention relates to a vehicle comprising the battery system according to the invention or the battery module according to the invention.

A further aspect of the invention relates to a method for controlling an electrically conductive connection to a battery system using the connector system according to the invention. The method includes one or more of the following steps: measuring, by a first temperature sensor, the temperature of a negative connection element and generating a first temperature signal based on the measured temperature of the negative connection element; sending the first temperature signal to a control unit; measuring, by a second temperature sensor, the temperature of a positive connection element and generating a second temperature signal based on the measured temperature of the positive connection element; sending the second temperature signal to the control unit; generating, by the control unit, a first value based on the first temperature signal and a second value based on the second temperature signal; computing, by the control unit, the difference of the first value and the second value; and generating, by the control unit, an alert signal when the absolute value of said difference exceeds a predefined threshold.

According to some embodiments, each of the steps is performed or repeated continuously in time.

According to some embodiments, each of the steps is repeated after a predefined time interval.

Further aspects of some embodiments according to the present invention may be learned from the dependent claims and their equivalents, or the following description and the corresponding figures.

BRIEF DESCRIPTION OF THE DRAWINGS

Further details and characteristics of some embodiments will become more apparent to those of ordinary skill in the art by describing in more detail aspects of some embodiments with reference to the attached drawings in which.

DETAILED DESCRIPTION

Figure 1:
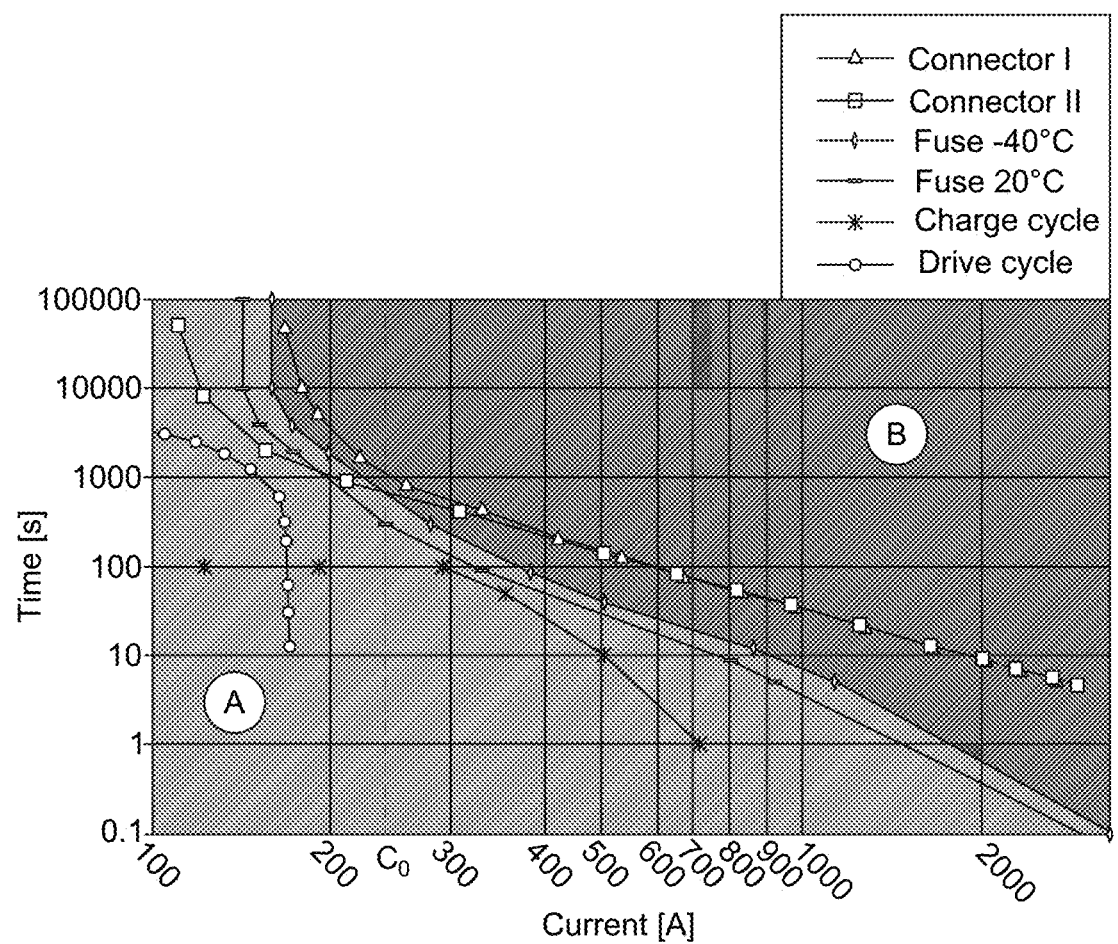
FIG. 1 is an example diagram used for designing connectors.

Reference will now be made in more detail to aspects of some embodiments, which are illustrated in the accompanying drawings. Aspects and characteristics of some embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Embodiments are provided as examples so that this disclosure will be more thorough and more complete, and will more fully convey the aspects and characteristics of embodiments according to the present invention to those skilled in the art. Accordingly, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value. Further, the use of "may" when describing embodiments of the present invention refers to "one or more embodiments of the present invention."

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments according to the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, for example, for motor driving of a hybrid vehicle. That is, the battery module may be formed by interconnecting the electrode terminals of the plurality of unit battery cells depending on a required amount of power and in order to realize a high-power rechargeable battery.

A battery pack is a set of any number of (for example, identical) battery modules. They may be configured in a series, parallel or a mixture of both to deliver the desired voltage, capacity, or power density. Components of battery packs include the individual battery modules, and the interconnects, which provide electrical conductivity between them.

For meeting the dynamic power demands of various electrical consumers connected to the battery system a static control of battery power output and charging is not sufficient. Thus, steady exchange of information between the battery system and the controllers of the electrical consumers is required. This information includes the battery systems actual state of charge (SoC), potential electrical performance, charging ability and internal resistance as well as actual or predicted power demands or surpluses of the consumers.

Battery systems usually comprise a battery management system (BMS) and/or battery management unit (BMU) for processing the aforementioned information. The BMS/BMU may communicate to the controllers of the various electrical consumers via a suitable communication bus, e. g. a SPI or CAN interface. The BMS/BMU may further communicate with each of the battery submodules, particularly with a cell supervision circuit (CSC) of each battery submodule. The CSC may be further connected to a cell connection and sensing unit (CCU) of a battery submodule that interconnects the battery cells of the battery submodule.

Thus, the BMS/BMU is provided for managing the battery pack, such as by protecting the battery from operating outside its safe operating area, monitoring its state, calculating secondary data, reporting that data, controlling its environment, authenticating it and/or balancing it.

To establish an electric connection between the battery of a vehicle and a load powered by the battery, a connector or connector system may be utilized. The lifetime of the connector or connector system generally depends at least partially on the temperature to which the connector or connector system is exposed during use. If a maximum temperature is exceeded, the connector or connector system may be destroyed. The temperature that may cause the connector or connector system to be heated up generally depends in turn essentially on the current being conducted through the connector or connector system. Thus, respective protection mechanisms are employed to prevent or reduce instances of the connector or connector system being heated up over a certain maximum temperature, which has to be determined in advance, for example, during the design process of the connector or connector system.

Connectors may be protected using a fuse or by monitoring the current conducted through the connector.

When using a fuse, the tolerances of the connector and the fuse need to be considered, ensuring that no reaction of the fuse occurs for electrical currents within the normal use (i. e., within a certain predefined current range), but guaranteeing for a blowing of the fuse in case of an overload of the connector. Hence, an oversizing of the connector based on the tolerances and estimation of relevant environment is required to ensure that the connector temperature keeps in a specified range.

When monitoring the current, an additional current measurement needs to be employed, which increases the cost. The real overload of the connector is estimated including all possible tolerances (e. g., boundary temperature, inner resistance, etc.). Again, an oversizing of the connector based on the tolerances and estimation of relevant environment may be utilized to ensure that the connector temperature keeps in a specified range.

Thus, aspects of some embodiments of the present invention may overcome or reduce at least some of the drawbacks of alternative systems to provide a connector system as well as battery system comprising this connector system, wherein the consideration of tolerances and thus an oversizing of components can be avoided. Aspects of some embodiments may also include a method for controlling an electrically conductive connection to a battery system using the connector system according to the invention.

FIG. 1 is a diagram used for designing a connector system. Shown is the lifetime (in units of seconds [s] on a logarithmic scale) in dependence of the current (in units of Ampère [A] likewise on a logarithmic scale) of components of the alternative connector system such as the connector itself (connector I; see the legend of the diagram) and a fuse. An example connector system using a fuse is explained in more detail below. As the behavior of the fuse strongly depends on its temperature, it is plotted in the diagram for two different temperatures −40° C. and +20° C. (see the legend of the diagram).

The lines describing the behavior of the fuse can be interpreted as follows: These lines each specify (for the respective temperature, here: −40° C. and +20° C.), how many seconds it takes for the fuse to operate (i. e., to stop the current flow), if a certain current measured in Ampère flows through the fuse. As can be seen from the diagram of FIG. 1, the fuse operates more slowly for lower temperatures (the curve for the fuse at −40° C. runs above the curve for the fuse at +20° C.). Since a worst-case scenario has to be considered for designing a safety-critical connector system, the upper curve showing the behavior of the fuse at −40° C. will be considered in the following. To facilitate the following description, the diagram is divided in two disjoint areas separated by the line illustrating the fuse's behavior at −40° C.: Area A is the region in the diagram below this line, and area B denotes the region in the diagram above this line.

Also shown in the diagram of FIG. 1 is the lifetime of the battery cells under the conditions of fast charging the battery system and during the conditions of an example drive cycle, for example, during use in a vehicle (see the diagram's legend for the respective lines). Both, the line illustrating the fast charging and the line illustrating the drive cycle, run below the curves indicating the behavior of the fuse, i. e., these lines run completely in area A. This is necessary, as otherwise the fuse could operate and stop the flow of current in situations of a normal use of the battery system.

Further, the curve showing the lifetime of a connector in the diagram can be interpreted as follows: It specifies, how many seconds it takes for the connector to become destroyed, if a certain (over-)current measured in Ampère flows through the connector. Hence, the curve showing the lifetime of the connector of the alternative connector system with a fuse (for example, the line of connector I; see the diagram's legend) runs above the lines indicating the behavior of the fuse, i. e., the curve of connector 1 runs completely in area B. Otherwise, for example, in case the curve of connector I would touch or intersect the curve of the fuse, the alternative connector system would not be properly designed, as in this case, a situation could happen, wherein the connector becomes destroyed by an over-current, before the fuse would operate and stop the current. In other words, area B denotes the area being protected by the fuse (at a fuse's temperature of −40° C.).

When designing the connector system, also the tolerances of its components have to be taken into account. Accordingly, there must be a minimum distance (in the vertical direction) between the curve of the fuse and the curve of the connector to assure that even if the connector is destroyed earlier as assumed (for a certain over-current) or if the fuse operates later than expected (for a certain over-current), the operation of the fuse still would occur earlier than the destruction of the connector. Further, as one typically does not know the boundary conditions for the specific application, the worst case has always to be considered. Based on these conditions, the connectors, fuses and/or current measurement equipment has to be selected for designing an alternative connector system.

As can be also taken from the diagram, the most critical effect on the lifetime of the connector system or a component thereof is caused by the temperature, which is in turn directly dependent on the current transported through the connector system. The larger the current transported through the connector system (and thus the higher the temperature of its components), the shorter the lifetime of the connector system and its components. This is reflected by the curves shown in the diagram, which are each descending when the current is increasing. Similar relations, of course, hold for the curves illustrating the lifetime of the battery cells for fast charging and use (drive cycle).

With the temperature measurement within the connector as introduced by the present invention, the main boundary conditions are no longer required for load estimation (see FIGS. 4 and 5 below). Based on the measured temperature, the load of the connector can be monitored. In urgent cases, countermeasures can be started, e. g., by a battery management unit (BMU) or a battery management system (BMS). In most cases, a more efficient connector system can thus be used in comparison to alternative connector systems (see FIGS. 1 to 3); hence a smaller—and thus cheaper—design for a connector system can be chosen when using a connector system according to the present invention.

This is reflected in FIG. 1 by the line illustrating the behavior (for example, the lifetime in dependence of an over-current) of the connector employed in a connector system according to some embodiments of the invention (connector II; see the legend of the diagram). As a fuse may not be necessary, the connector (connector II) can be chosen less robust in comparison to the connector required in the alternative connector system (connector I), for example, the lifetime of the connector employed in the connector system according to some embodiments of the invention (connector II) for a certain over-current may be reduced in comparison to the lifetime of the connector of alternative systems (connector I). Hence, the curve showing the behavior of the connector of the system according to some embodiments of the invention (connector II) runs below or on the curve illustrating the behavior of connector of alternative systems (connector I). Normally, a less robust connector may be less expensive; accordingly, the manufacturing costs for manufacturing a connector system will be reduced by embodiments according to the present invention.

The characteristic is in particular present for the range of currents lower than a certain current $c_0$ in the diagram of FIG. 1 denoting the current, at which the line illustrating the behavior of the connector employed in the connector system according to the invention (connector II) intersects the curve of the fuse of the alternative connector system, as in this range, the curve runs in area A and the connector would thus not be protected by the fuse (see above).

Figure 2:
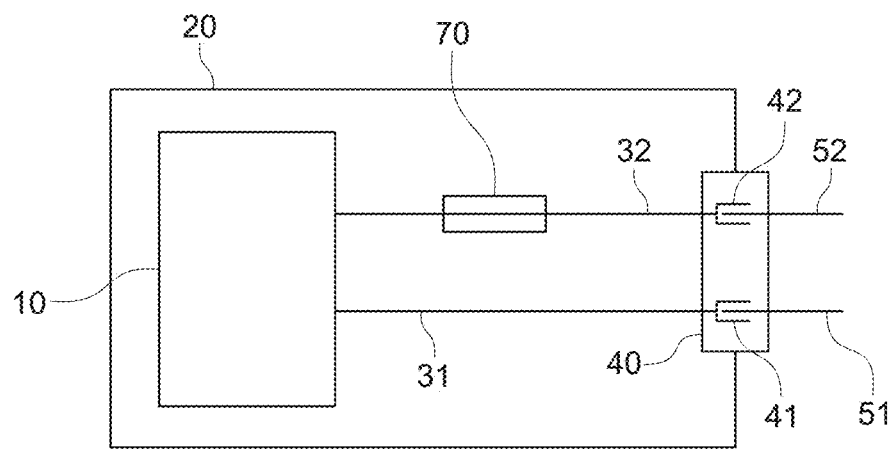
FIG. 2 shows a schematic illustration of a connector system with a fuse, wherein the connector system is integrated in a battery system.

FIG. 2 shows a schematic illustration of a connector system with a fuse 70, wherein the connector system is integrated in a battery system. The battery system may be adapted as a power source of a vehicle. A stack of battery cells 10 is accommodated within a housing 20. The stack of battery cells 10 has an anode and a cathode. Integrated in the wall of the housing 20 is a connector 40 having a negative connection element 41 and a positive connection element 42. The negative connection element 41 is connected, via a first electrical connection line 31, with the anode of the stack of battery cells 10. Correspondingly, the positive connection element 42 is connected, via a second electrical connection line 32, with the cathode of the stack of battery cells 10. Integrated into the second connection line 32 is a fuse 70. The fuse 70 is adapted to interrupt the electrical connection via the second connection line 32 in case the current exceeds a predefined value. Instead of being integrated into the second connection line 32, the fuse could also be integrated into the first connection line 31 in alternative embodiments of connector systems and/or battery systems.

In use, for example when implemented into a vehicle, the connector 40 is connected with a suitable counterpart such that the negative connection element 41 is connected with a respective counterpart connection element 51 and the positive connection element 42 is connected with a respective counterpart connection element 52. Via the external counterparts 51, 52 of the negative and positive connection elements 41, 42, the electric current may then be transported to a load, for example, a motor.

The current at which the fuse 70 interrupts the conduction has to be adjusted to the maximum current being allowed to be transported through the connector 40 and thus, through each of the negative and positive connection elements 41, 42 of the connector 40. When adjusting the maximum fuse current to the connector 40, the tolerances of the fuse 70 as well as of the connector 40 have to be taken into account, for example, for the sake of safety, the fuse 70 must be adapted to break the electrical connection at current smaller than the current, which could actually be transported by the connector 40.

During normal use, for example, when the current conducted through the conductor 40 remains in a certain predefined range (for example, in the range from 0 Ampère to the maximum fuse current), the fuse 70 lets the current pass through the second connection line 32. However, if the current at some point in time exceeds over a predefined threshold being defined by the maximum fuse current of the fuse 70 (i. e., in case of an overcurrent), the fuse 70 interrupts the electrical connection within the second connection line 32 such that the electric circuit with the load and the stack of battery cells 10 is interrupted, or in other words, the stack of battery cells 10 is electrically disconnected from the load. Hence, the connector 40 is protected from over-current by fuse 70.

Figure 3:
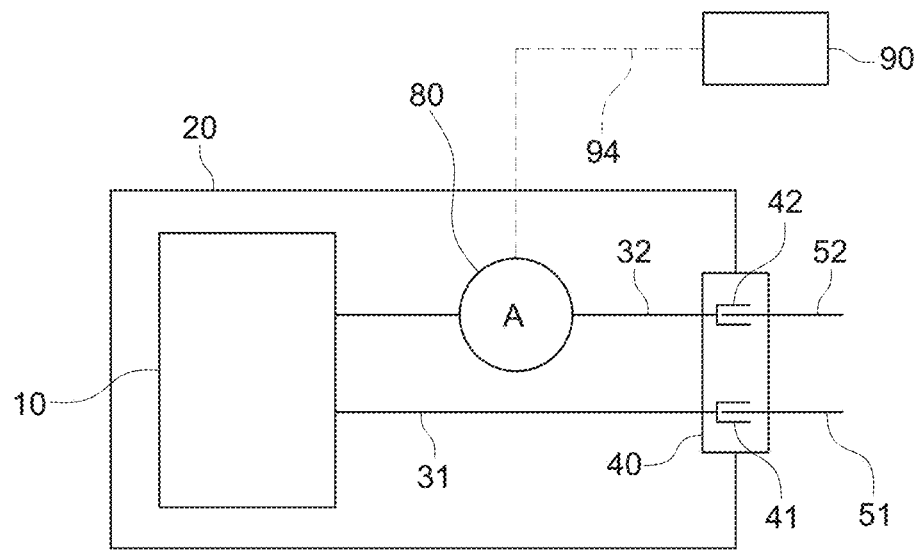
FIG. 3 shows a schematic illustration of a connector system with an amperemeter, wherein the connector system is integrated in a battery system.

Fuses often exhibit the disadvantage of being single-use devices only. Thus, in the above-described assembly, the fuse 70 may be replaced by an amperemeter 80 connected to a control unit 90. This is shown in FIG. 3. The amperemeter measures the current flowing through the second connection line 32, and a signal corresponding to the current (for example, a current signal) is sent to the control unit 90. Then, the control unit 90 monitors—continuously or in sufficiently small time intervals—the strength of the current signal (which corresponds to the measured current) and checks whether or not the strength of the current signal exceeds over a predefined threshold that corresponds to the maximum current allowed to be transported through the connector 40. Once the current exceeds that predefined threshold, the control unit 90 triggers an electrical disconnection of the battery system from the load. This can be done, e. g., by a relay, which is implemented either within the battery system or connector system shown in FIG. 3 (for example, in one of the first and second connection lines 31, 32) or outside of the battery system or connector system shown in FIG. 3 (for example, in one of the counterparts 51, 52 of the connection elements 41, 42).

Similar to the example of FIG. 3, the current at which the control unit 90 interrupts the electric conduction (for example, the threshold) has to be adjusted to the maximum current being allowed to be transported through the connector 40 and thus, through each of the negative and positive connection elements 41, 42 of the connector 40. When adjusting the threshold to the connector 40, the tolerances of the amperemeter 80 as well as of the connector 40 have to be taken into account, i. e., for the sake of safety, the threshold must be chosen such that control unit 90 breaks the electrical connection at current smaller than the current, which could actually be transported by the connector 40.

Figure 4:
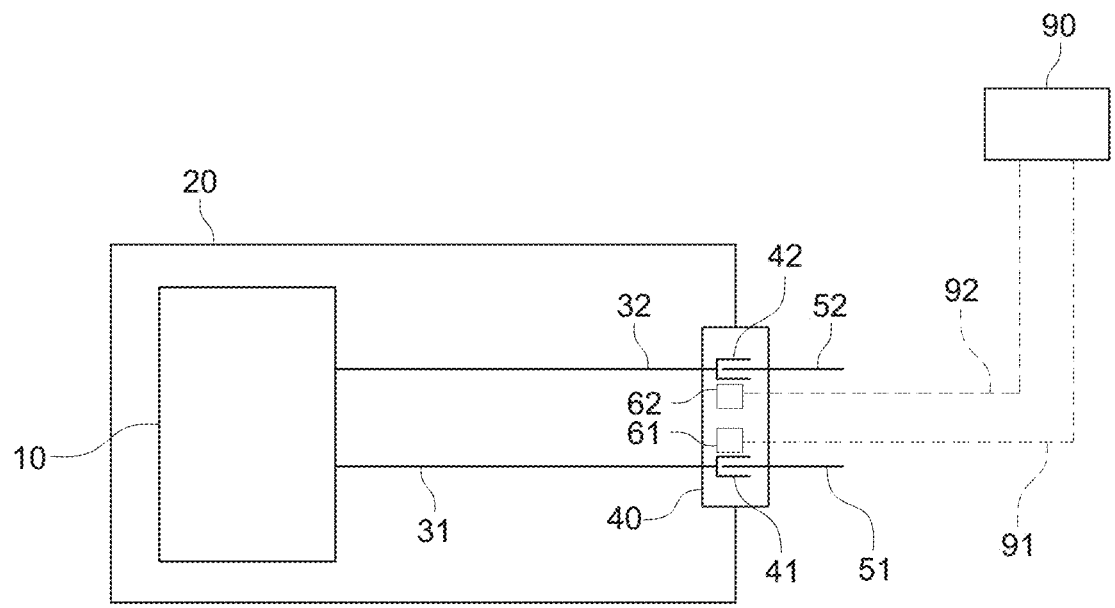
FIG. 4 shows a schematic illustration of a connector system according to some embodiments embodiment of the invention, wherein the connector system is integrated in a battery system.

The connector system, according to some embodiments of the invention, may be integrated into a battery system is shown in FIG. 4. The basic set-up of the battery system is similar to that described above in the context of FIGS. 2 and 3. A stack of battery cells 10 is accommodated within a housing 20. The stack of battery cells 10 has an anode and a cathode. Integrated in the wall of the housing 20 is a connector 40 having a negative connection element 41 and a positive connection element 42. The negative connection element 41 is connected, via a first electrical connection line 31, with the anode of the stack of battery cells 10. Correspondingly, the positive connection element 42 is connected, via a second electrical connection line 32, with the cathode of the stack of battery cells 10.

However, in contrast to the assemblies shown in FIGS. 2 and 3, there is neither a fuse nor an amperemeter integrated in one of the connection lines 31, 32. Instead, a first temperature sensor 61 is thermally connected to the negative connection element 41 and a second temperature sensor 62 is connected to the positive connection element 42. Each of the first and second temperature sensors 61, 62 may be a thermistor, for example a negative temperature coefficient thermistor (NTC thermistor) or a positive coefficient temperature thermistor (PTC thermistor), or a thermocouple. However, also other kinds of temperature sensors may be used. For example, the first and second temperature sensors 61, 62 may be of the same type.

The first temperature sensor 61 measures the temperature of the negative connection element 41 and generates a corresponding first temperature signal encoding the measured temperature of the negative connection element 41. The first temperature signal is then transmitted to a control unit 90. Similarly, the second temperature sensor 62 measures the temperature of the positive connection element 42 and generates a corresponding second temperature signal encoding the measured temperature of the positive connection element 42. The second temperature signal is then also transmitted to the control unit 90. Each of the first and second temperature signal may be an electric signal (e. g., a voltage level) depending monotonously on the measured temperature. However, the temperature signal may also be a wireless signal, for example, a near-field communication (NFC) signal or a WLAN signal or the like.

Then, the control unit 90 compares temperature signals received from the first and second temperature sensor 61, 62. The comparison can be performed using analog (non-digital) methods or using digital methods. The control unit generates a first value based on the first temperature signal and a second value based on the second temperature signal. In particular when using an analog method for the comparison and if the types of the first and second temperature sensor 61, 62 are identical, the first value may directly be the strength of the first temperature signal and the second value may directly be the strength of the second temperature signal. If the types of the sensors are not identical, at least one of the first or second temperature signals may be transformed such that first value and second value yield temperature values in the same temperature scale. The first and second values may correspond to the temperature in a standardized temperature scale (for example, correspond to units in ° C.). However, the first and second values may correspond to any other temperature scale, which may be linear or non-linear. According to some embodiments, the first and second values encode or correspond to the measured temperature in the same scale.

Instead of values corresponding to the absolute temperature measured by the first and second temperature sensors 61, 62, relative values may be used for the comparison. For example, the measured temperatures (in a certain temperature scale) may be divided by the measured temperature (in the same scale) of the negative connection element 41 or divided by the measured temperature of the positive connection element 42 or divided by a mean value (e. g., the arithmetic mean) of the temperatures of the first and second connection elements 41, 42.

The comparison may be performed by calculating the difference between the first value (based on the first temperature signal) and the second value (based on the second temperature signal). Then, if the absolute value of the difference exceeds a predefined value, the control unit 90 generates an alert signal. The alert signal may be provided at an output of the control unit. The alert signal may be an electric signal (e. g., a voltage level) and/or a wireless signal, e. g., a near-field communication (NFC) signal or a WLAN signal or the like.

If the absolute value of the difference between the first value and the second value exceeds over a predefined threshold, the probability that a contact resistance between one of the connection elements 41, 42 and its respective counterpart connection element 51, 52 (the latter not being part of the invention) is increased, which in turn may indicate a connection failure.

Additionally, also the absolute temperatures measured at the negative and/or positive connection element 41, 42 may be supervised by the control unit 90. Then the control unit 90 may also output an alert signal indicating that the maximum allowed temperature of one of the connection elements 41, 42 has been exceeded.

Figure 5:
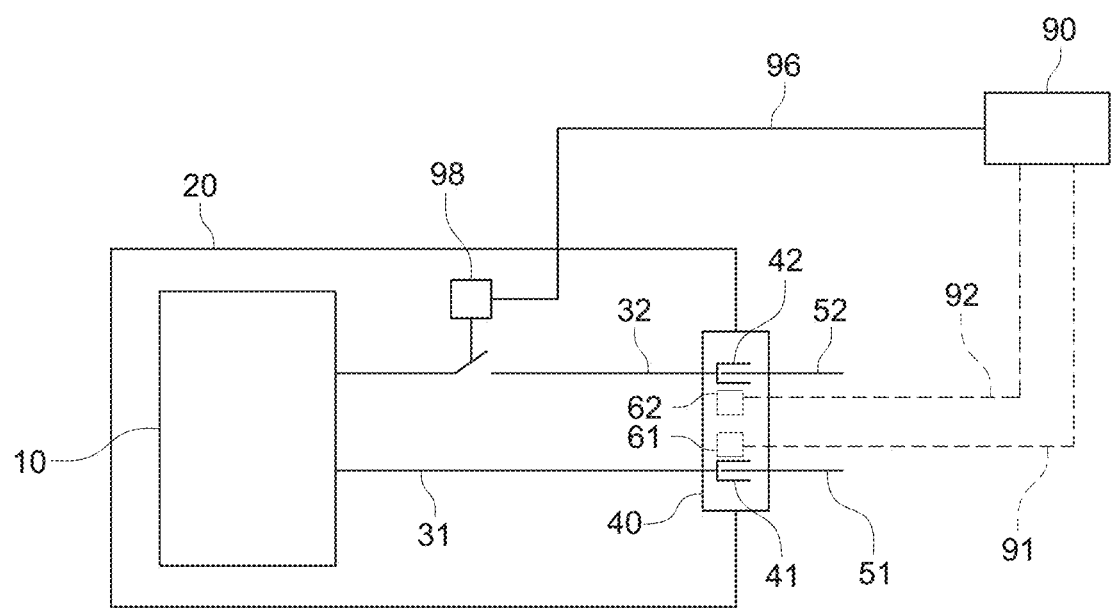
FIG. 5 shows a schematic illustration of a connector system according to a some embodiments of the invention, wherein the connector system is integrated in a battery system.

The alert signal may be configured such that it directly suitable to control a relay 98 as shown in FIG. 5. In the example shown in the figure, the relay 98 is implemented into the second connection line 32 between the positive connection element 42 and the cathode of the stack of battery cells 10. However, the relay 98 could alternatively also be implemented into the first connection line 31. The control unit 90 is connected, via a signal line 96, to the relay 98 and operates the relay 98 such that the relay 98 interrupts the second connection line 32 upon receiving a respective signal (a current) from the control unit 90. Instead of being integrated into one of the connection lines 31, 32 connection the connection elements 41, 42 with the stack of battery cells 10, the relay 98 could also be positioned outside the battery system (e. g., connected to the counterpart element 52 of the positive connection element 42) at some position in the circuit being powered by the battery system that allows for disconnecting the battery system from the load. Alternatively, the alert signal can also be transmitted to the load itself or a further control unit controlling the load such that the load is shut down in response to receiving the alert signal.

Alternatively, the alert signal could also be transmitted from the control unit 90 to a battery management unit (BMU) of the battery system. Then, the BMU may control the operations upon receiving the alert signal from the control unit 90. For example, the BMU may be configured to control a relay so as to interrupt the circuit powered by the battery system or may be configured to shut down the load driven by the battery system. According to some embodiments, the control unit 90 may be integrated within the BMU.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims, and their equivalents.

SUMMARY OF SOME OF THE REFERENCE SYMBOLS

- 10: stack of battery cells
- 20: housing of a battery system
- 31: connection between the negative connection element and the anode of the stack of battery cells
- 32: connection between the positive connection element and the cathode of the stack of battery cells
- 40: connector
- 41: negative connection element
- 42: positive connection element
- 51: counterpart of negative connection element
- 52: counterpart of positive connection element
- 61: first temperature sensor
- 62: second temperature sensor
- 70: fuse
- 80: amperemeter
- 90: control unit
- 91: signal line between first temperature element and control unit
- 92: signal line between second temperature element and control unit
- 94: signal line between amperemeter and control unit
- 96: signal line between control unit and relay
- 98: relay

What is claimed is:

1. A connector system for a battery system, the connector system comprising:
   a connector configured to electrically connect to a counterpart of the connector, wherein the connector comprises a negative connection element and a positive connection element;
   a first temperature sensor thermally connected to the negative connection element;
   a second temperature sensor thermally connected to the positive connection element; and
   a control unit configured to receive a first temperature signal from the first temperature sensor and to receive a second temperature signal from the second temperature sensor;
   wherein the control unit configured to generate a first value based on the first temperature signal and a second value based on the second temperature signal,
   wherein the control unit is further configured to generate a first alert signal in response to an absolute value of a difference between the first value and the second value exceeding a predefined threshold,
   wherein the negative connection element is electrically connected with an anode of a stack of battery cells via a first electrical connection line, and the positive connection element is electrically connected with a cathode of the stack of battery cells via a second electrical connection line,
   wherein the control unit is further configured to output a second alert signal based on at least one of the first value and the second value, and
   wherein the second alert signal is a signal suitable for directly controlling a relay implemented into one of the first electrical connection line and the second electrical connection line.

2. The connector system of claim 1, wherein the predefined threshold depends on the first temperature signal or on the second temperature signal or on a mean value of the first and second temperature signal.

3. The connector system of claim 1,
   wherein the connector is formed as a socket configured to connect to a corresponding plug; or
   wherein the connector is formed as a plug configured to connect to a corresponding socket.

4. The connector system of claim 1, wherein the negative connection element and the positive connection element are each configured to establish a high voltage connection.

5. The connector system of claim 1, wherein at least one of the temperature sensors comprises a negative temperature coefficient thermistor, a positive coefficient temperature thermistor, or a thermocouple.

6. The connector system of claim 1, wherein the control unit is further configured to generate the second alert signal in response to the first value or the second value indicating that an absolute temperature of the negative connection element or the positive connection element exceeds a predefined maximum value.

7. The connector system of claim 1, wherein the connector is integrated in a housing adapted to accommodate a stack of battery cells.

8. The connector system of claim 7, wherein the battery system includes the stack of battery cells and the relay, and wherein the stack of battery cells and the relay are accommodated in the housing.

9. The connector system of claim 8, wherein the battery system includes a battery management unit, and wherein the control unit is integrated into the battery management unit.

10. A battery module comprising two or more battery systems according to claim 8.

11. A vehicle comprising the battery system of claim 8.

12. A method for controlling an electrically conductive connection to a battery system, the method comprising:
   measuring, by a first temperature sensor, a temperature of a negative connection element and generating a first temperature signal based on the measured temperature of the negative connection element;
   sending the first temperature signal to a control unit;
   measuring, by a second temperature sensor, a temperature of a positive connection element and generating a second temperature signal based on the measured temperature of the positive connection element;
   sending the second temperature signal to the control unit;
   generating, by a control unit, a first value based on the first temperature signal and a second value based on the second temperature signal;
   computing, by the control unit, a difference of the first value and the second value; and
   generating, by the control unit, a first alert signal in response to an absolute value of the difference exceeding a predefined threshold,
   wherein the method is further comprising outputting, by the control unit, a second alert signal based on at least one of the first value and the second value,
   wherein the negative connection element is electrically connected with an anode of a stack of battery cells via a first electrical connection line, and the positive connection element is electrically connected with a cathode of the stack of battery cells via a second electrical connection line, and
   wherein the second alert signal is a signal suitable for directly controlling a relay implemented into one of the first electrical connection line and the second electrical connection line.

13. The method according to claim 12, wherein each operation is performed or repeated continuously in time.

14. The method according to claim 12, wherein each operation is repeated after a predefined time interval.

\* \* \* \* \*